United States Patent
Lutz et al.

(10) Patent No.: US 10,091,938 B2
(45) Date of Patent: Oct. 9, 2018

(54) TOOTHED CRUSHING DISK FOR A GRAIN PROCESSOR AND METHOD FOR PRODUCING THE TOOTHED CRUSHING DISK

(71) Applicant: GEBRUEDER BUSATIS GESELLSCHAFT M.B.H., Purgstall an der Erlauf (AT)

(72) Inventors: Wolfgang Lutz, Wieselburg (AT); Markus Nadlinger, Euratsfeld (AT); Harald Scharner, Purgstall (AT)

(73) Assignee: Gebrueder Busatis Gesellschaft m.b.H., Purgstall an der Erlauf (AT)

( * ) Notice: Subject to any disclaimer, the term of this patent is extended or adjusted under 35 U.S.C. 154(b) by 14 days.

(21) Appl. No.: 15/342,298

(22) Filed: Nov. 3, 2016

(65) Prior Publication Data
US 2017/0118917 A1 May 4, 2017

(30) Foreign Application Priority Data
Nov. 4, 2015 (AT) ........................ GM50197/2015 U

(51) Int. Cl.
*A01D 82/02* (2006.01)
*A01F 11/06* (2006.01)
*A01D 43/10* (2006.01)

(52) U.S. Cl.
CPC .............. *A01F 11/06* (2013.01); *A01D 43/10* (2013.01); *A01D 82/02* (2013.01)

(58) Field of Classification Search
CPC .......... A01D 43/10; A01D 82/02; B02C 4/08; B02C 4/30; B02C 9/02; B02C 7/13; B02C 7/17; B02C 7/188; B02C 7/186; B02C 7/184; A01F 11/06
USPC ... 241/11, 13, 29, 22, 23, 100, 259.1, 261.3, 241/65, 296; 460/121, 150
See application file for complete search history.

(56) References Cited

U.S. PATENT DOCUMENTS

| | | | | |
|---|---|---|---|---|
| 4,365,546 A | * | 12/1982 | Giguere | B02C 9/04 99/567 |
| 5,467,931 A | * | 11/1995 | Dodd | B02C 7/12 241/261.2 |
| 7,210,388 B2 | * | 5/2007 | Pacher | B23D 61/127 30/345 |
| 7,827,883 B1 | * | 11/2010 | Cherng | B23K 26/34 219/121.64 |
| 8,096,221 B2 | * | 1/2012 | Tarrerias | B23D 65/00 76/104.1 |

(Continued)

Primary Examiner — Robert Eric Pezzuto
(74) Attorney, Agent, or Firm — Laurence A. Greenberg; Werner H. Stemer; Ralph E. Locher

(57) ABSTRACT

A toothed crushing disk for a grain processor includes teeth having a trailing tooth flank, which is a so-called tooth back, and a leading tooth flank, which is a so-called tooth face, on the surface of the teeth. The teeth have a wear protection zone in the region of the tooth back which is continuous or is divided into partial zones and has a wear resistance which is greater than that of the material of a base member of the toothed crushing disk. The base member has a tooth structure which determines the shape of the teeth and the wear protection zone is produced by using a high-energy beam method with the geometry of the tooth structure being substantially maintained. A method for producing a toothed crushing disk for a grain processor having teeth on the surface thereof is also provided.

22 Claims, 2 Drawing Sheets

(56) References Cited

U.S. PATENT DOCUMENTS

| | | | | |
|---|---|---|---|---|
| 8,991,144 B2* | 3/2015 | Clauss | ................... | A01D 43/10 56/16.4 C |
| 9,038,359 B2* | 5/2015 | Augustine | .............. | A01D 34/73 56/295 |
| 9,833,785 B2* | 12/2017 | Den Boer | ................. | B02C 4/08 |
| 2010/0325902 A1* | 12/2010 | Dutta | ....................... | B26B 9/00 30/346 |
| 2013/0316771 A1* | 11/2013 | Frommelt | .............. | A01D 82/02 460/150 |
| 2015/0135905 A1* | 5/2015 | Maurer | ................... | B23B 51/02 76/115 |

* cited by examiner

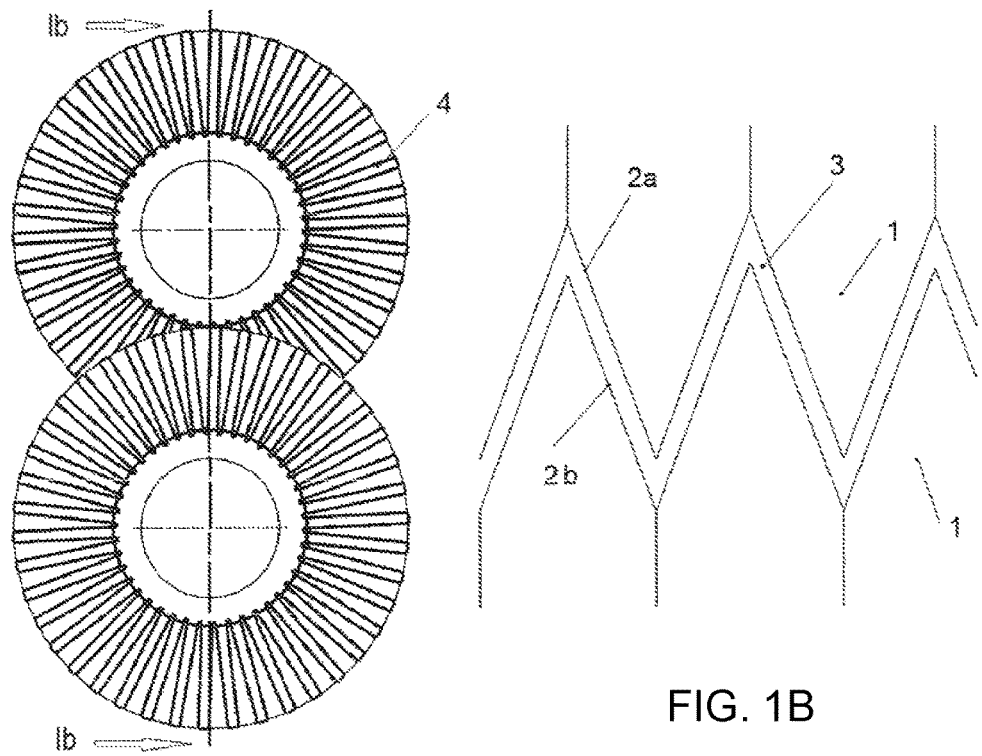
FIG. 1A
FIG. 1B
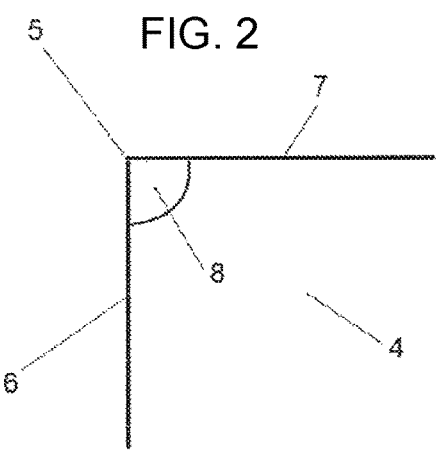
FIG. 2

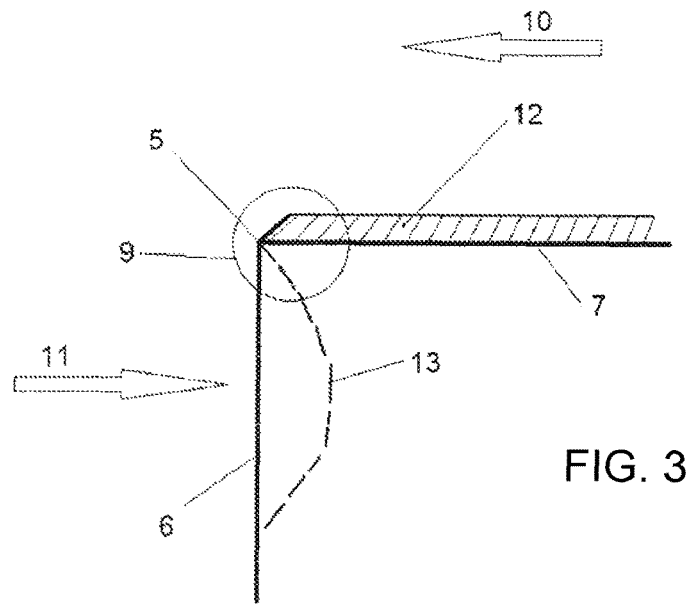
FIG. 3
FIG. 4A
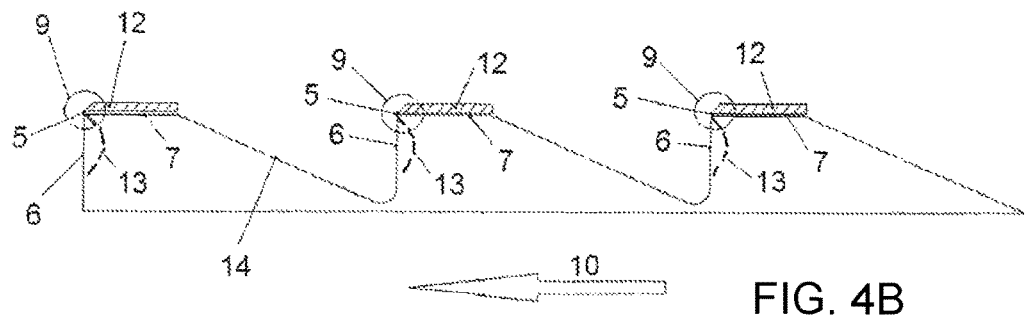
FIG. 4B
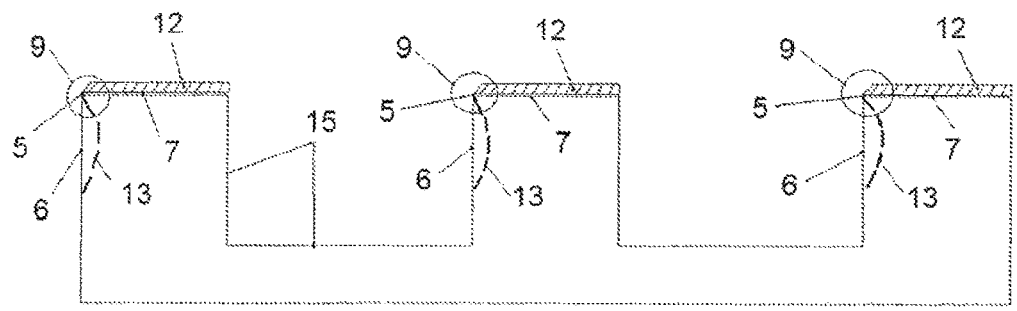

TOOTHED CRUSHING DISK FOR A GRAIN PROCESSOR AND METHOD FOR PRODUCING THE TOOTHED CRUSHING DISK

CROSS-REFERENCE TO RELATED APPLICATION

This application claims the priority, under 35 U.S.C. § 119, of Austrian Patent Application GM 50197/2015, filed Nov. 4, 2015; the prior application is herewith incorporated by reference in its entirety.

BACKGROUND OF THE INVENTION

Field of the Invention

The invention relates to a toothed crushing disk for a grain processor including teeth having a trailing tooth flank, which is a so-called tooth back, and a leading tooth flank, which is a so-called tooth face, on the surface of the teeth. The teeth have a wear protection zone in the region of the tooth back which is continuous or is divided into partial zones and has a wear resistance which is greater than that of the material of a base member of the toothed crushing disk. The invention further relates to a method for producing a toothed crushing disk for a grain processor having teeth on the surface thereof.

In harvesting machines for corn and whole plants both as animal food and for biogas installations, after cutting and chopping, the harvested material is guided through a crushing device, the so-called grain processor, with toothed crushing rollers or disks which break up the grains and consequently enable the harvested material to be pulped. At the same time, the crushing device is used to convey the harvested material. In the case of grain processors with toothed crushing rollers, the chopped harvested material is supplied to a pair of cylindrical rollers with teeth provided on the surface thereof. The two rollers rotate in opposite directions and one of the rollers has a higher rotation speed which is, for example, increased by 20%. The two rollers have tooth edges which are disposed opposite each other in a friction gap. In order to be able to effectively perform the function of breaking up the grains and the function of conveying the harvested material, a spacing between the tooth edges of the two rollers over the entire length and in any rotation position, has to be in a narrow predetermined range, for example between 0.5 and 3.0 mm for corn. As a result of the work being performed, wear occurs at the tooth edges and leads to a rounding of the tooth edges. The spacing between the tooth edges in the gap of the two rollers thereby increases and the function of breaking up the grains is lost. There are further known grain processors in which a plurality of toothed crushing disks are disposed beside each other on two respective parallel shafts. The disks form a non-linear outer contour as seen in a cross-section through the axes of their row formation. In that case, that outer contour of a disk row engages in the outer contour of the other disk row in such a manner that a parallel friction gap is produced between the disk rows. Friction gap contours which extend in such a non-linear manner in toothed crushing disks enable the friction gap to be increased and consequently enable better grain pulping in comparison with the linear friction gap in toothed crushing rollers. The chopped harvested material is accordingly conveyed between the two disk rows and in that case the grains are broken up and the harvested material is conveyed. The advantage of toothed crushing disks is that with increased wear in a region along the row formation axis, only the disks in that region may be replaced. In order to decrease the wear, it is currently known to plate the toothed crushing disks with hard chromium, to nitride them or to boride them. All of those methods are very costly, on one hand, and the service lives are inadequate, on the other hand.

SUMMARY OF THE INVENTION

It is accordingly an object of the invention to provide a toothed crushing disk for a grain processor and a method for producing the toothed crushing disk, which overcome the hereinafore-mentioned disadvantages of the heretofore-known disks and methods of this general type and which make it possible to operate in a more cost-effective manner, that is to say with which production is more cost-effective and/or service-life is longer.

With the foregoing and other objects in view there is provided, in accordance with the invention, a toothed crushing disk for a grain processor, comprising teeth having a trailing tooth flank, a so-called tooth back, and a leading tooth flank, a so-called tooth face, on the surface thereof. The teeth have, in the region of the tooth back, a wear protection zone which is continuous or which is divided into partial zones and has a wear resistance which is greater than that of the material of the base member of the toothed crushing disk. The base member has a tooth structure which determines the shape of the teeth and the wear protection zone is produced by using a high-energy beam method with the geometry of the tooth structure being substantially maintained.

High-energy beam methods are distinguished by a high energy density so that, during the production of the wear protection zone, a short active time of the high-energy beam is sufficient and the material of the base member is influenced only on the surface or in regions which are very close to the surface up to approximately 1 mm. In particular, as a result of the high-energy beam method with a pre-hardened base material, in the region of the heat influence zone, there is produced only a small decrease in hardness. If the base material has not been hardened, there occurs as a result of the small penetration depth, rapid cooling and consequently hardening of the base material and consequently a supporting action for the wear protection zone. As a result of the high-energy beam method, there is produced a wear protection zone which leads to a considerable increase of service-life, wherein the shape of the teeth is no longer substantially changed by the high-energy beam method. As a result of this processing close to the end contour, good preservation of the tooth edges is possible and reprocessing is not required.

In this instance, the wear protection zone is preferably partially produced by using complete or partial recessing of the tooth face. If the wear protection zone is provided only on the tooth flank which trails the tooth edge during the crushing process (tooth back) or if the wear protection zone has a recess at least in the region of the tooth edge on the tooth face, a self-sharpening effect is produced as a result of the wear of the base material on the leading tooth flank (tooth face).

According to embodiments of the invention, the tooth flank angle which is enclosed by the tooth back and the tooth face is formed in the range from 45° to 135°, preferably from 60° to 120°, in a particularly preferred manner 90°.

Advantageously, the wear protection zone has a wear resistance which is at least 10% greater and preferably at least 25% greater than the wear resistance of the material of the base member. The wear resistance or the abrasion resistance can in this instance be determined, for example, by using the friction wheel method in accordance with the standard ASTM G65.

The wear protection zone can be produced by structural conversion of the material of the base member in a hardening or remelting method. In those methods, the material of the base member itself is changed in the region close to the surface by the high-energy beam without any additive and consequently the wear resistance is increased.

Alternatively, the wear protection zone may be produced by using coating, deposition welding, dispersion, alloying or melting methods using a high-energy beam. As a result of these methods, an additive is applied or introduced onto or into the surface of the base member.

Since, with high-energy beam methods, the energy input into the base material is carried out only in regions very close to the surface up to approximately 1 mm, and the coating thickness which is optionally applied is very small, that is to say, from 0.05 up to a maximum of 0.5 mm, preferably from 0.1 to 0.4 mm, in a particularly preferred manner from 0.2 to 0.3 mm, the shape of the teeth is not changed significantly.

According to the invention, the wear protection zone may contain hard material particles. As a result of angular hard materials, in particular in the case of large hard material particles, a rough surface may be obtained and ensures good detection of the harvested goods during the breaking-up process and a good conveying action on the flow of harvested material.

Preferably, the wear protection zone is a hard material coating which is applied by using a deposition welding method. The formation of the rough surface is further promoted in that the hard material particles protrude from the matrix material as a result of a rapid solidification process.

In this instance, the hard material coating which is applied by using a deposition welding method advantageously contains hard material particles which are embedded in a matrix material and which have a size between 40 and 250 μm, wherein the matrix material preferably contains nickel, cobalt or a nickel/chromium/silicon compound and the hard material particles are preferably carbides, nitrides or oxides, in a particularly preferred manner tungsten carbides.

The base member may, at least in the region of the teeth, be pre-hardened or subsequently hardened, in particular by using edge layer hardening, in a particularly preferred manner by using inductive hardening.

With the objects of the invention in view there is also provided a method for producing a toothed crushing disk for a grain processor, which comprises providing teeth with a trailing tooth flank, a so-called tooth back, and a leading tooth flank, a so-called tooth face, on the surface thereof, wherein the teeth have a wear protection zone in the region of the tooth back which is continuous or which is divided into partial zones and has a wear resistance which is greater than that of the material of the base member, the base member is provided with a tooth structure which determines the shape of the teeth and the wear protection zone is produced by using a high-energy beam method with the geometry of the tooth structure being substantially maintained.

The wear protection zone is preferably partially produced by using complete or partial recessing of the tooth face.

In this instance, the structure of the material of the base member can be converted without any additive in a hardening or remelting method.

Alternatively, an additive is applied or introduced onto or into the base member by using coating, deposition welding, dispersion, alloying or melting methods.

In this instance, for example, in a deposition welding method, the base member may be coated with a hard material coating by using a high-energy beam.

Other features which are considered as characteristic for the invention are set forth in the appended claims.

Although the invention is illustrated and described herein as embodied in a toothed crushing disk for a grain processor and a method for producing the toothed crushing disk, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1A is a diagrammatic plan view and FIG. 1B is an enlarged longitudinal-sectional view of toothed crushing disks which are disposed on two parallel shafts;

FIG. 2 is a schematic illustration of a tooth in a region of a tooth edge;

FIG. 3 is a perspective view of a tooth having a wear protection zone on the tooth back; and FIGS. 4A and 4B are longitudinal-sectional views of two variants of the construction of teeth on toothed crushing disks according to the invention.

DETAILED DESCRIPTION OF THE INVENTION

Referring now to the figures of the drawings in detail and first, particularly, to FIGS. 1A and 1B thereof, there are seen respective plan and longitudinal-sectional views of toothed crushing disks 1 which are disposed beside each other on two parallel shafts and which have teeth 4. The disks 1 form a non-linear outer contour 2a or 2b as seen in cross-section through the axes of the row formation thereof. The outer contour 2a of a disk row engages in this instance in the outer contour 2b of the other row of disks in such a manner that a parallel friction gap 3 is produced between the disk rows.

FIG. 2 shows a tooth 4 of a toothed crushing disk 1 with a tooth edge 5 which is formed by a leading tooth flank, the so-called tooth face 6, and a trailing tooth flank, the so-called tooth back 7, through a tooth flank angle 8.

FIG. 3 shows a self-sharpening effect 9 on the tooth edge 5 and illustrates a movement direction 10 and an engagement direction 11 of harvested material which is provided on the tooth back 7 with a wear protection zone 12. This is generated by using a higher level of wear 13 of a base material on the tooth face 6 compared with wear on the wear protection zone 12.

FIGS. 4A and 4B show the wear 13 of the base material on the tooth face 6 and the resulting self-sharpening effect 9 on the tooth edge 5 in two preferred transition forms or shapes 14, 15 between the tooth back 7 with the wear protection zone 12 and the tooth face 6 which trails in each case in the movement direction 10.

The invention claimed is:

1. A toothed crushing disk for a grain processor, the toothed crushing disk comprising:
    a base member produced with a tooth structure with a geometry, said base member being formed of a material having a wear resistance; and
    teeth having a surface with a trailing tooth back and a leading tooth face, said teeth having a shape determined by said tooth structure of said base member;
    said teeth having a wear protection zone in a vicinity of said tooth back, said wear protection zone being continuous or divided into partial zones, said wear protection zone having a wear resistance being greater than said wear resistance of said material of said base member, and said wear protection zone having characteristics of having been produced by a high-energy beam method with said geometry of said tooth structure being substantially maintained.

2. The toothed crushing disk according to claim 1, wherein said tooth face is at least partially recessed to partially produce said wear protection zone.

3. The toothed crushing disk according to claim 1, wherein said tooth back and said tooth face enclose a tooth flank angle being in a range of from 45° to 135°.

4. The toothed crushing disk according to claim 1, wherein said wear resistance of said wear protection zone is at least 10% or at least 25% greater than said wear resistance of said material of said base member.

5. The toothed crushing disk according to claim 1, wherein said wear protection zone has characteristics of having been produced by a structural conversion of said material of said base member in a hardening or remelting method without any additive.

6. The toothed crushing disk according to claim 1, wherein said wear protection zone has characteristics of having been produced by applying or introducing an additive by using coating, deposition welding, dispersion, alloying or melting methods.

7. The toothed crushing disk according to claim 6, wherein said wear protection zone contains hard material particles.

8. The toothed crushing disk according to claim 6, wherein said wear protection zone is a hard material coating applied by deposition welding.

9. The toothed crushing disk according to claim 8, wherein said hard material coating applied by deposition welding has a thickness of from 0.05 to 0.5 mm or from 0.1 to 0.4 mm or from 0.2 to 0.3 mm.

10. The toothed crushing disk according to claim 8, wherein said hard material coating applied by deposition welding contains hard material particles embedded in a matrix material, said hard material particles having a size between 40 and 250 μm.

11. The toothed crushing disk according to claim 10, wherein said matrix material contains nickel, cobalt or a nickel/chromium/silicon compound, and said hard material particles are carbides, nitrides, oxides or tungsten carbides.

12. The toothed crushing disk according to claim 10, wherein said matrix material is a rapidly hardening matrix material, and said hard material particles protrude from said rapidly hardening matrix material and form a rough surface.

13. The toothed crushing disk according to claim 1, wherein said base member is pre-hardened or subsequently hardened at least in a vicinity of said teeth.

14. The toothed crushing disk according to claim 13, wherein said base member has a hardened edge layer.

15. The toothed crushing disk according to claim 13, wherein said base member has an inductively hardened edge layer.

16. The toothed crushing disk according to claim 1, wherein said tooth back and said tooth face enclose a tooth flank angle being in a range of from 60° to 120°.

17. The toothed crushing disk according to claim 1, wherein said tooth back and said tooth face enclose a tooth flank angle being 90°.

18. A method for producing a toothed crushing disk for a grain processor, the method comprising the following steps:
    providing a base member produced with a tooth structure with a geometry, the base member being formed of a material with a wear resistance;
    providing teeth having a surface with a trailing tooth back and a leading tooth face, the teeth having a shape determined by the tooth structure of the base member;
    providing the teeth with a wear protection zone in a vicinity of the tooth back, the wear protection zone being continuous or divided into partial zones and the wear protection zone having a wear resistance greater than the wear resistance of the material of the base member; and
    producing the wear protection zone by using a high-energy beam method with the geometry of the tooth structure being substantially maintained.

19. The method according to claim 18, which further comprises partially producing the wear protection zone by complete or partial recessing of the tooth face.

20. The method according to claim 19, which further comprises performing a structural conversion of the material of the base member without any additive in a hardening or remelting method.

21. The method according to claim 19, which further comprises applying or introducing an additive into or onto the base member by coating, deposition welding, dispersion, alloying or melting methods.

22. The method according to claim 21, which further comprises coating the base member with a hard material coating in a deposition welding method.

* * * * *